United States Patent
Cuervo (10) Patent No.: US 8,843,573 B2
(45) Date of Patent: Sep. 23, 2014

(54) LIGHTWEIGHT MESSAGING WITH LOCATION BETWEEN USERS OF A SOCIAL NETWORKING SYSTEM

(75) Inventor: Soleio Cuervo, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 271 days.

(21) Appl. No.: 13/112,948

(22) Filed: May 20, 2011

(65) Prior Publication Data

US 2012/0296987 A1 Nov. 22, 2012

(51) Int. Cl.
*H04L 12/58* (2006.01)
*G06F 15/16* (2006.01)
*G06Q 50/00* (2012.01)

(52) U.S. Cl.
CPC .............. *H04L 12/588* (2013.01); *H04L 51/20* (2013.01); *G06Q 50/01* (2013.01); *H04L 51/32* (2013.01); *H04L 12/5865* (2013.01)
USPC ............ 709/206; 709/207; 709/224; 709/229

(58) Field of Classification Search
USPC .......................... 709/204, 206, 207, 224, 229
See application file for complete search history.

(56) References Cited

U.S. PATENT DOCUMENTS

| | | | |
|---|---|---|---|
| 7,899,468 B2 * | 3/2011 | Lohtia et al. ................ | 455/456.1 |
| 2006/0262967 A1 * | 11/2006 | Hurst et al. ................... | 382/128 |
| 2006/0270419 A1 * | 11/2006 | Crowley et al. ............. | 455/456.2 |
| 2007/0214141 A1 * | 9/2007 | Sittig et al. ......................... | 707/7 |
| 2008/0070593 A1 * | 3/2008 | Altman et al. ................. | 455/457 |
| 2008/0189380 A1 * | 8/2008 | Bosworth et al. ............. | 709/207 |
| 2008/0189768 A1 * | 8/2008 | Callahan et al. .................. | 726/4 |
| 2009/0164913 A1 * | 6/2009 | Davar et al. .................... | 715/751 |
| 2011/0187497 A1 * | 8/2011 | Chin ............................ | 340/5.54 |
| 2011/0225250 A1 * | 9/2011 | Cypes et al. .................. | 709/206 |

* cited by examiner

*Primary Examiner* — Xavier Szewai Wong
*Assistant Examiner* — Natali N Pascual Peguero
(74) *Attorney, Agent, or Firm* — Fenwick & West LLP (57) ABSTRACT

A social networking system provides a mechanism for lightweight messaging (e.g., a "poke") between users of a social networking system. To initiate a new message from one user to another, the sender requests a poke by specifying the intended recipient. The system receives the request, obtains a location of the sender, verifies that the sender and recipient are both users of the social networking system and have established a connection, and then transmits a lightweight message to the recipient. The message history between users may be stored for later viewing, and third party services may access the messaging capability, e.g., via APIs.

19 Claims, 3 Drawing Sheets

LIGHTWEIGHT MESSAGING WITH LOCATION BETWEEN USERS OF A SOCIAL NETWORKING SYSTEM

BACKGROUND

This invention relates generally to social networking, and in particular to lightweight messaging systems that communicate a location of a user to another user in a social networking system.

Social networking systems allow users to designate other users as connections (or otherwise connect to or form relationships with other users), contribute and interact with media items, use applications, join groups, list and confirm attendance at events, create pages, and perform other tasks that facilitate social interaction. Messaging in social networks vary from the most private including personal one-on-one messages and emails to the most public messages including posting on profiles as "wall posts," notifications, invites. The problem with these modes of communication is that they require the user to provide content such as by typing, tagging a picture, adding a video, or otherwise providing content for the message. This requires effort on the part of the user in drafting the message. As a result, a user may procrastinate sending the message, for example, when the user is busy or feels too lazy to provide content for a message.

Social networking systems attempt to provide messaging functionality to their users that the users are likely to use as often as possible. Frequent and regular visits by the users to the social networking system are typically associated with advertising revenue for the social networking system since advertisers are more likely to advertise on systems regularly and frequently visited by users. Accordingly, additional mechanisms of communicating within a social networking system would be desirable, especially mechanisms that are lightweight for the user experience.

SUMMARY

Embodiments of the invention provide users of a social networking system with a lightweight mechanism to communicate with each other, where the mechanism does not require the sender to enter any message content beyond the recipient. In certain embodiments of the invention, the lightweight communication mechanism is referred to as a "poke," and it provides location information about the sender.

In one embodiment, a poke includes the location of the sender who initiated the poke, in addition to implicitly registering the time of communication. The location and time may add contextual meaning to a poke that is shared between a pair of users. Depending on the relationship between the users on the social networking system, additional meaning may be ascribed to the poke by the person receiving it. In one embodiment, two users may access a user interface to view a history of the pokes between the two users, where the history contains the locations and times of the pokes. Beneficially, the users may use this history for a number of applications that may extend beyond the social networking system. For example, applications by third party providers may access the poke functionality described herein via a set of APIs, thereby using the social networking system to provide similar lightweight communication mechanism and/or otherwise take advantage of the use of the poke communication mechanism within the social networking system.

Other embodiments of the invention comprise user interfaces for facilitating the poke feature. For example, this user interface may include a list of other users of the social networking system with whom a user has established a relationship (e.g., the user's friends), and this list may be organized contextually. In one embodiment, such as where the user interface is presented on a mobile device, the list of friends may be sorted by geographic proximity. In another embodiment, the list may be organized by the user's level of affinity with the friends in the lists. Various combinations and different organization schemes for the user interface are also possible. In one embodiment, the user interface also provides an input mechanism that allows the user to initiate a poke to another user on this list using a simple, intuitive gesture. On a touch screen mobile device, for example, the gesture may comprise touching a portion of the device's screen that displays the intended recipient.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

In certain situations, people may desire to communicate with others without providing explicit content with the communication. In such cases, the mere context of a communication between two people (such as the time or the communication and/or the location of one or both of the parties to the communication) is sufficient to convey a message without further content. For example, if someone has agreed to pick up a friend at the airport, the mere existence of the communication from that friend near the time of the scheduled arrival may be sufficient to communicate that the friend has arrived and is ready to be picked up—without requiring the sender to type content in a message (such as, "I'm here, please pick me up."). This can be particularly helpful for mobile applications, where users are likely to prefer communicating with as little typing as necessary.

In the physical world, an actual poke from one human being to another in real life is an example of such a communication. Social networking systems may provide lightweight messages (also referred to as a poke message, or a poke) that emulate a poke from one user to another. In embodiments of the invention described herein, a lightweight message is a message sent by a user to another without requiring that the user explicitly provide content for the message. This lightweight message communicates information to the recipient merely by the existence of the message itself, along with possible contextual information such as a location of the sender and a time associated with the message. For example, by communicating a lightweight message, a sender can convey to the receiver that the sender was thinking about the receiver. Additional information can be conveyed by the lightweight message depending on the context of the communication. The context may comprise the relationship between two connections, a location of the sender and/or recipient, or a time associated with the communication. For example, a lightweight message sent by a user from a particular location can comprise information indicating the location of the user.

Figure 1:
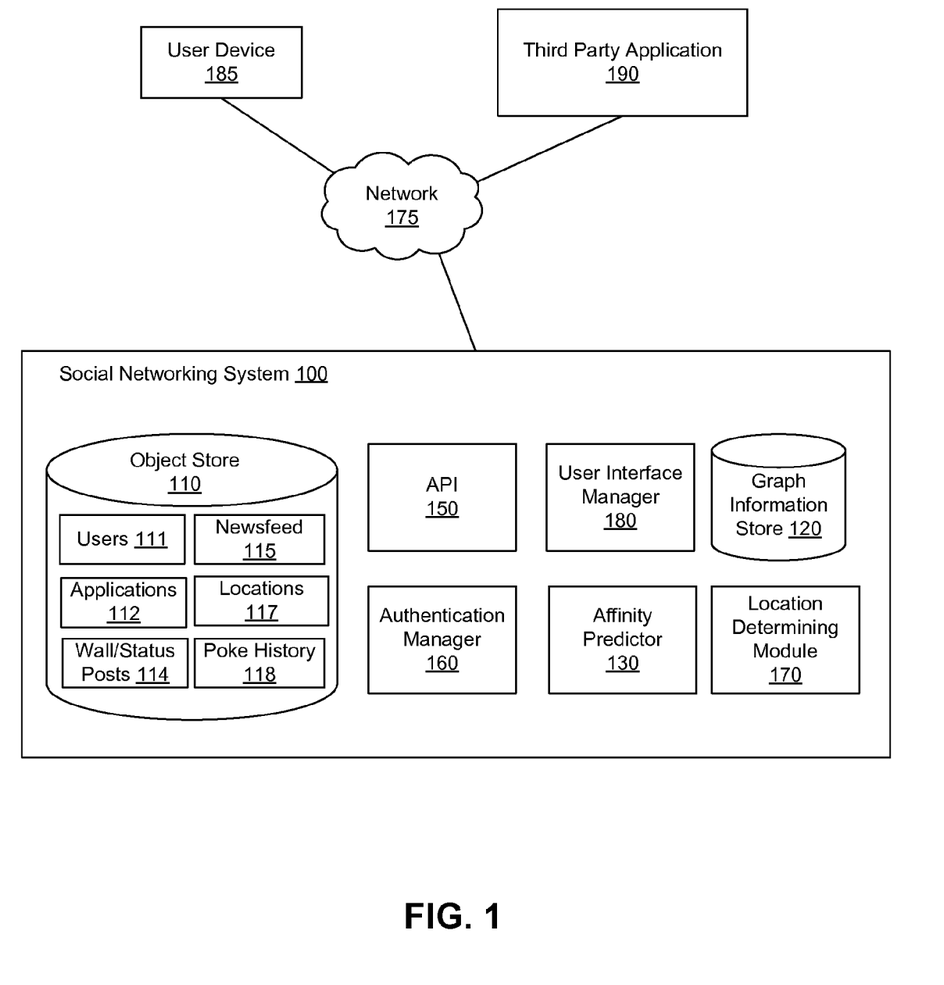
FIG. 1 is a high level drawing describing an embodiment of the environment of a social networking system.

FIG. 1 is a high level drawing of an embodiment of a social networking system. FIG. 1 illustrates a social networking system 100, a user device 185, and a third party application 190 connected by a network 175. A user of the user device 185 interacts with the social networking system 100 using a device such as a personal computer or a mobile phone. The user can interact with the social networking system 100 via an application such as a web browser. The web browser allows the user to perform operations including communicating with the connections of the user in the social networking system 100, browsing content associated with the connections of the user, and the like. Additionally, the third party application 190 may also interact with the social networking system 100 via a system-provided application programming interface (API) 150. For example, the third party application may perform operations supported by the API 150, such as enabling users of the third party application to send each other messages via the social networking system 100.

The social networking system 100 comprises components including an object store 110, an authentication manager 160, a graph information store 120, and an affinity predictor 130. Some embodiments of the social networking system 100 have different and/or other modules than the ones described herein, and the functions may be distributed among the modules in a different manner than described herein.

The object store 110 stores information about various objects tracked by the social networking system 100. These objects may represent a variety of entities with which a user may interact in the social networking system 100, including, without limitation, other users 111 of the social networking system (represented, e.g., as a profile object for the user), applications 112 (e.g., a game playable within the social networking system), 114 wall/status posts (e.g., short sentences input by user about himself on his profile or public messages to other specified objects of the social networking system), 115 newsfeed (e.g., aggregation of content and updates from objects in the social networking system), 117 locations associated with a user (e.g., "Santa Clara, Calif., USA" on a geographic map as opposed to the IP address), and 118 poke history (e.g., the history of pokes between any two users including the location and time).

The poke history 118 contains a history of the pokes between any two users tracked by the social networking system 100. When a user is viewing the information contained within the poke history 118, the results may be filtered by the sender of the poke, the recipient of the poke, a location associated with the poke (e.g., the sender's location), and/or the time that the poke was sent or received. In some embodiments, the poke history between two users associated with a poke is accessible only by the two users. In other embodiments, any user that has a connection to either of the sender or recipient users may view the poke history between them.

The object store 110 may further store objects representing other entities represented by the social networking system 100, such as events (e.g., a concert that users may attend), groups to which users may belong, pages or hubs (e.g., pages constituting a particular organization's presence on the system), comments and notes.

In one embodiment, the social networking system 100 further comprises a graph information store 120, which represents the objects of the object store 110 as nodes that are linked together in a "social graph." In this embodiment, the social networking system represents the social information in a social graph. The social graph comprises a set of nodes connected by edges, where each node corresponds to an object, such as a user of the social networking system or content within the system. The edges between the nodes represent relationships between the objects corresponding to the nodes, such as actions taken by one object on another object. The nature and number of edges helps determine the "affinity" between two nodes on the social graph.

The graph information store 120 thus contains information about the relationships between or among the objects, represented as edges connecting various nodes. Various examples of edges in the social graph include, an edge between two user objects representing that the users have a relationship in the social networking system (e.g., are connected, or have communicated, viewed the other user's profile, or interacted in some way), an edge between a user object and an application object representing that the user has used the application, an edge between a user object and a group object representing that the user belongs to the group, and an edge between a user object and a page object representing that the user has viewed the page. For example, if one user establishes a connection with another user in the social networking system, the two users are each represented as a node, and the edge between them represents connection between them in the social network system.

In one embodiment, edges in the graph information store 120 have associated metadata, such as a label describing the type of relationship (e.g., "friend" as the label between two user objects), or a value quantifying the strength of the relationship. Further, a relationship degree, or "distance," between any two objects may be ascertained by determining the number of edges on the shortest path between the objects. For example, two user objects that have an edge between them (e.g., denoting a connection) have a relationship degree (or "distance") of one and are considered first-order connections. Similarly, if a user object A is a first-order connection of user object B but not of user object C, and B is a first-order connection of C, then objects A and C have a relationship degree of two, indicating that C is a second-order connection of A (and vice-versa).

The location determining module 170 is responsible for obtaining information relating to the location of the user device 185 from which a request for a poke is received. In some embodiments of the invention, the information may be in the form of GPS coordinates, a street address, or an IP address from which a geographical location may be determined. The user interface manager 180 manages the user interface for requesting a poke at user device 185. The user interface for requesting a poke is described further in conjunction with FIG. 3.

In one embodiment the affinity predictor 130 uses the data from graph information 120 to predict the most likely objects that a user wants to interact with in any given context. One exemplary context is the sorting of connections for presentation on the user's profile page on the social networking system 100. The context may also be the sorting of connections for presentation on a mobile device of the user based on factors such as location of connections relative to user, strength of the relationship or a combination of factors.

The authentication manager 160 authenticates a user of the device 185 as being a member of the social networking system 100. An authenticated user is allowed by the social networking system 100 to access information based on the privacy settings of the users of the social networking system 100. For example, the user may be allowed access to information associated with the connections of the user as determined by the privacy settings of the connections. Thus, the authentication manager 160 allows a user to "log into" the social networking system 100 from a user device 185.

Figure 2:
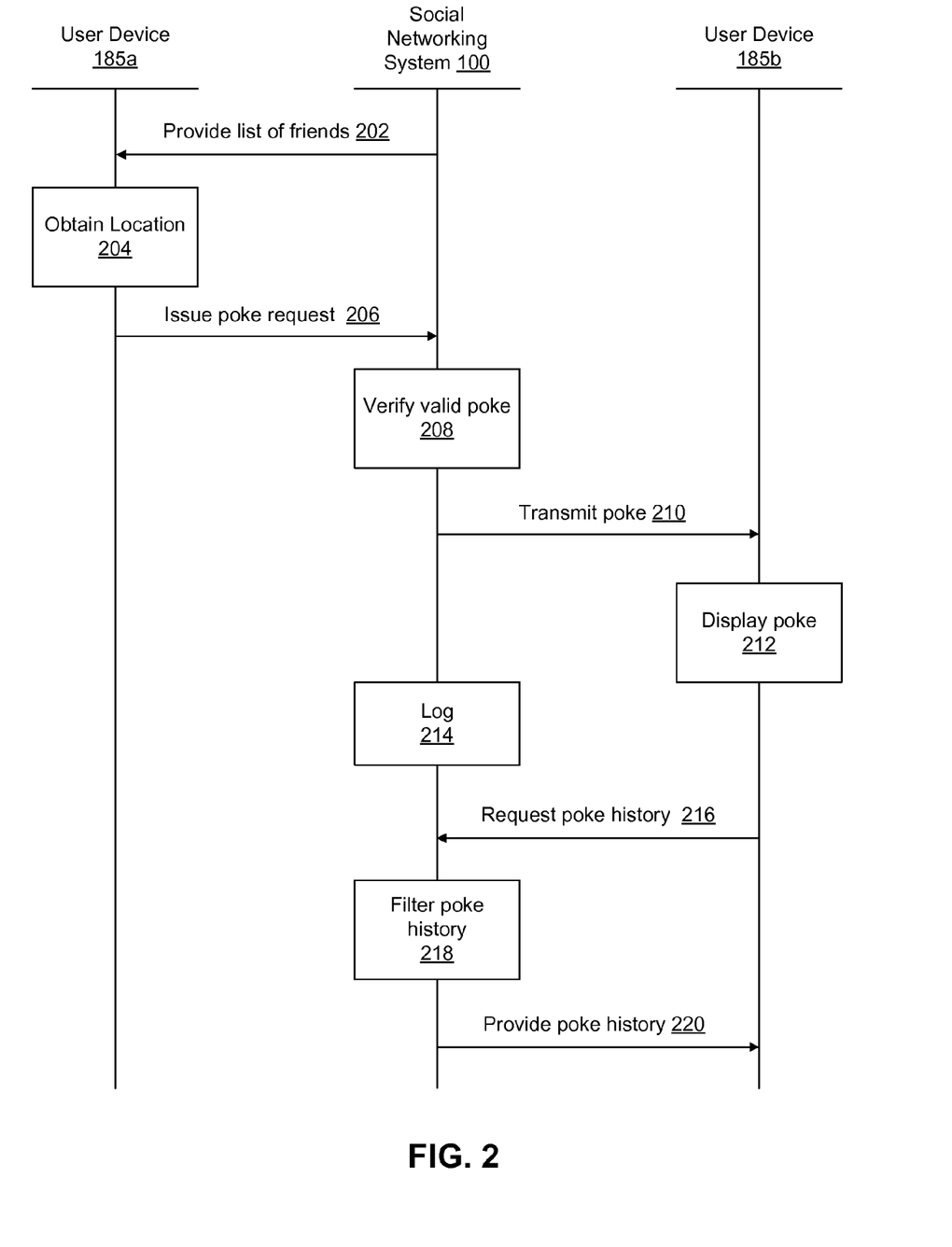
FIG. 2 is an interaction diagram illustrating the actions taken between two users on user devices A, B and the social networking system, in one embodiment.

FIG. 2 is a high-level interaction diagram of a poke from a sending user (or sender) at user device 185a to a receiving user (or recipient) on user device 185b through the social networking system 100, according to one embodiment. To enable the sender to initiate a poke from the user device 185a, the social networking system 100 provides 2020 a list of connections (e.g., friends) whom the sender can poke. This list may be responsive to an action by the user at the user device 185a, such as navigating to a contacts list or another user interface on the user device 185a that allows the user to initiate a poke message to another user. In one embodiment, a user may send a poke message only to other users with whom the users has established a connection in the social networking system 100. The social networking system may thus provide 202 a list of all of the users with whom the sending user has established a connection, or that list may be filtered according to various criteria.

In one embodiment, the list may be sorted so that likely recipients are closer to the top of the list, thereby making it easier for the sending user to select the desired recipient. For example, the provided list may be sorted according to a measure of affinity that the sender has for the users on the list, as provided by the affinity predictor 130. In this way, closer friends will appear towards the top of the list. Alternatively, the list may be sorted based on the proximity of the users on the list to the sending user. The list may also be filtered by location. For example, when a user is determined to have arrived at a location, the user may be presented with connections of the user that are determined to be within a threshold distance of the user. For example, if a user living in New York is visiting San Francisco, the connections of the user that live close to San Francisco may be presented to the user. This allows the user to send a lightweight message to the connections living close to the San Francisco, letting them know that he is visiting San Francisco. A user can send a check-in message to the social networking system indicating that the user arrived at a location, for example, a restaurant. The user can be presented with connections of the user that also sent a check-in message indicating they arrived at the same location or nearby locations, for example, a mall in which the restaurant is located. This allows the user to send a lightweight message the friends at the location or nearby locations.

In one embodiment, the user device 185a of the sender obtains 204 a location of the device 185a so that it can communicate that information with the poke message. This location is obtained 204 without requiring the user to enter the location manually. The location may be obtained using any of a variety of mechanisms using the location determining module 170, as described above.

Responsive to a request by the sender, the user device 185a issues 206 a poke request to the social networking system 100. The poke request contains an identifier of the recipient and the determined location of the user device 185a. Unlike other forms of communication that may occur over the social networking system 100, the sender need not provide any additional content for the poke message. In fact, in an embodiment, the interface for requesting a poke message does not include any mechanism for providing any message content; the sender merely specifies the recipient.

Upon receiving the poke request, the social networking system 100 verifies 208 that the poke is valid. For example, the social networking system 100 may verify that the sender and intended recipient have established a connection in the social networking system 100 and otherwise have permissions to exchange a poke. For example, in one embodiment only users having first-order connections are permitted to exchange a poke. Other embodiments may additionally permit second-order connections (e.g., a friend of a friend) to exchange a poke. Moreover, the social networking system 100 may verify that the intended recipient has not blocked the sender from sending messages. If the poke request is verified, the social networking system 100 then adds the poke to the graph information store 120.

The social networking system 100 then transmits 210 the poke message to the user device 185b of the recipient. This transmitted poke message contains an identification of the sender as well as the location of the user device 185a of the sender, which acts as a proxy for the location of the sender. The location information may be expressed as geographical coordinates, a street address, a nearby business or other registered location, a geographical position on a map, or via any other mechanism appropriate for the situation. Responsive to receiving the poke, the user device 185b displays 212 the poke to the recipient, the display including an identification of the sender and the sender's location. Optionally, the displayed poke may include a timestamp associated with the poke, such as the time that the poke was initiated and/or the time that the poke was delivered to or viewed by the recipient.

The social networking system 100 then logs the poke 214 in the poke history 118. The logged information may include one or more of a timestamp, a sender ID, a recipient ID, and a sender location. In a particular embodiment, the timestamp may be the time the poke request is received 206. In another embodiment, it may be the time the social networking system 100 transmits 210 the poke to the recipient. Responsive to receiving the poke, the recipient's user device 185b may also obtain its location and report that location back to the social networking system 100, which may in turn include the recipient's location with the logged poke. The social networking system 100 may also communicate the recipient's location back to the sender, subject to privacy settings.

In some embodiments, the social networking system 100 enables users to view a poke history containing previously transmitted poke massages along with their logged information, such as location and time information. In one embodiment, the social networking system allows only those users who are a party to a previously sent poke message (i.e., a sender or recipient) to view it. In other embodiments, any object connected to either of the users on the social graph may access the poke history between them.

Continuing with FIG. 2, the recipient uses user device 185b to request 216 a poke history from the social networking system 100. The request for poke history may specify certain filtering criteria, such as the other user or users involved in the poke, a period of time when the poke was sent, and/or a particular location associated with the poke. The social networking system 100 then filters 218 the requested poke history based on the provided criteria and provides 220 the poke history to user device 185b associated with the request for the poke history. Although FIG. 2 illustrates the recipient requesting the poke history, any user may request his or her poke history from the social networking system 100, including the sender.

Figure 3:
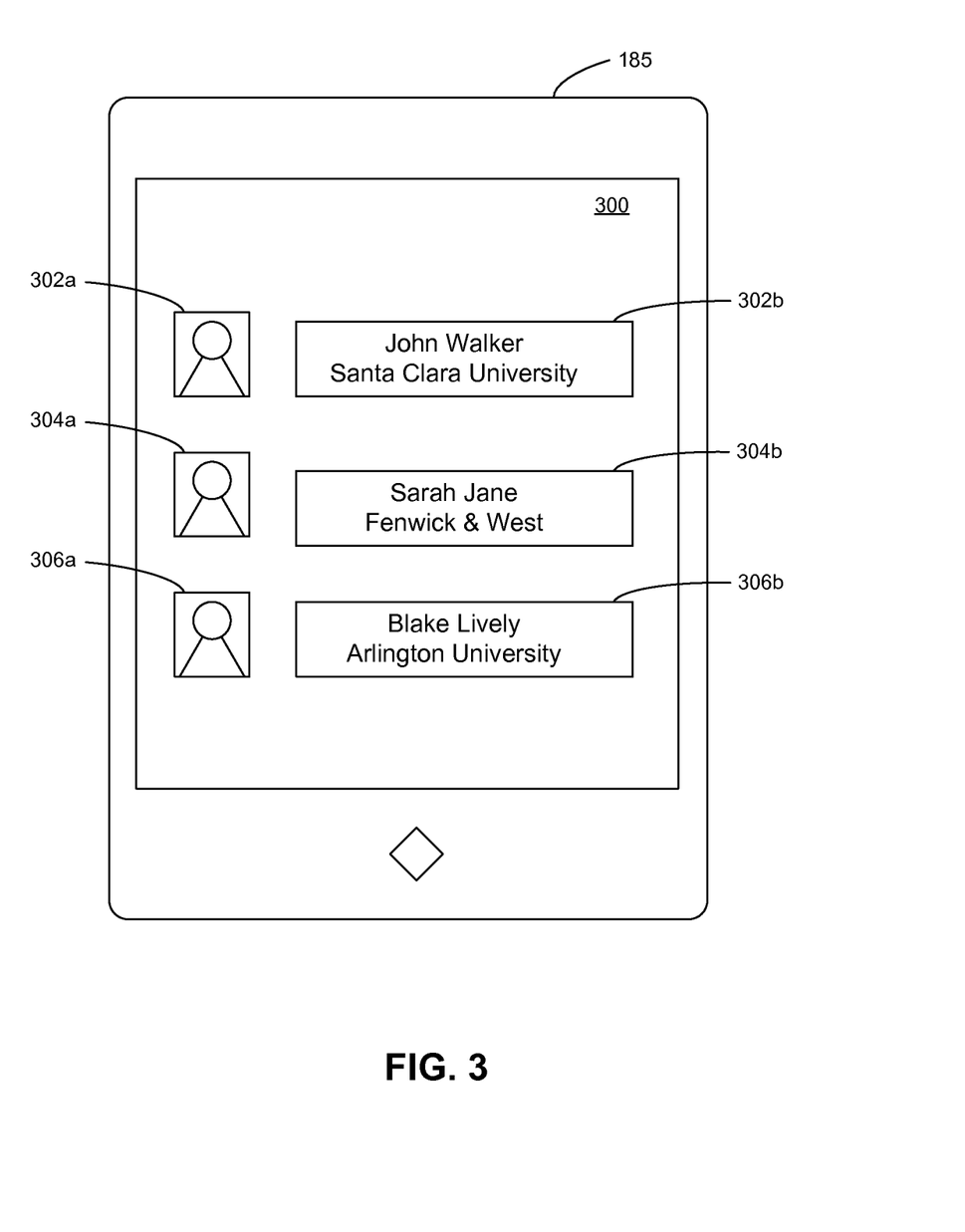
FIG. 3 is an illustration of a user interface for lightweight messaging on the social networking system, in one embodiment.

FIG. 3 illustrates an embodiment of a user interface for lightweight messaging in the social networking system 100, the user interface 300 displayed on a user device 185. As described above, the user interface 300 is presented to the user at the user device 185 to allow the user to initiate a poke of another user in a social network. Various embodiments of the user interface 300 may be implemented on a mobile phone, laptop, netbook, tablets, and any other computing device that enables communications with the social networking system 100.

The user interface 300 for enabling a poke message may include a listing of a plurality of other users of the social networking system 100. In one embodiment, this listing is a contacts list, which may be obtained from the social networking system 100 or from a local memory of the user device 185. In the example shown in FIG. 3, the user interface 300 displays users 302, 304, and 306. In this listing, user 302 is represented by a profile photo 302a and brief description 302b, user 304 is represented by a profile photo 304a and brief description 304b, user 306 is represented by a profile photo 306a and brief description 306b, and so on. In other embodiments, different types of information may be provided for each user. In one embodiment, the poke message is initiated from a page of information about just the recipient, i.e., without a listing of multiple users.

As described above, the listing may be filtered and/or sorted for various purposes. Providing a sorting of connections that the user is most likely to poke in a given context allows the user to poke minimize the number of gestures used for sending poke message to multiple connections. For example, the user may wish to poke multiple friends with minimal scrolling or minimal number of keystrokes, or by merely tapping of thumbnails on a screen. Filtering the listing beneficially removes irrelevant or unwanted information from the user interface 300.

The user interface may accept a single action input to initiate a poke message to a particular user. For example, the user interface 300 may receive a request to poke another user without requiring the sender to perform actions such as inputting data into a message body or selecting information from a drop down list or complex menu system. Rather, to poke another user via the interface 300, the user may provide a simple gesture. If the user device 185 has a touch screen display, for example, to poke user 302 the send may perform a gesture that comprises simply poking on the thumbnail picture 302a associated with user 302. Various other gestures may be used for this purpose, such as pressing and holding over the image 302a for a sufficient amount of time (e.g., 1 or 2 seconds).

In certain embodiments of the invention, the user interface 300 may request a confirmation from the sender before initiating the poke message, to prevent unintended poke messages. On a laptop or a desktop computer, or other device that is not equipped with a touch screen, the gesture for initiating a poke may include clicking on the thumbnail image 302a or moving a cursor over the thumbnail image 302a and selecting it. In other embodiments, the user interface 300 may include a separate selectable poke button for initiating a poke.

In one embodiment, the user interface 300 allows the sender to select a plurality of connections and initiate poke messages to all of the selected connections. For example, if someone has just arrived at a restaurant to meet several friends, they may wish to let these friends know that they arrived. Accordingly, embodiments of the invention may facilitate the selection of multiple users. Initiating the poke may result in a plurality of separate poke messages sent to each of the specified recipients or a single poke message sent to the group of recipients. In the latter embodiment, each of the recipients may see that the poke was sent to the other recipients.

In one embodiment, the social networking system 100 may expose the functionalities described herein to applications and services offered by third parties, separate from the social networking system operator. This may be achieve by a set of APIs that allow third-party applications 190 to initiate new poke messages, receive poke messages, and access the poke history between two or more users. A third party application 190 may thus provide the lightweight messaging capabilities to users of the social networking system 100. Within the context of a specific third-party application, a poke message and the poke history may have a more specific meaning that when poking generally.

An example of a third party application 190 making use of the poke feature is a time card application for employees in a firm. Each employee may have a registered user account with the social networking system 100 and establishes a connection with a user account associated with the employer. When an employee arrives at work and before leaving each day, the employee sends a poke message to the employer. Since the poke message includes location and time information, the employer can verify that the employee was onsite at the specified times. A third party developer may provide an application that accesses the employer's poke history and prepares a timecard report for the employees of the business. Hence, these poke messages can be used in place of a card-in and card-out actions of a standard timecard system, thereby replacing existing timecard systems with a simple software solution.

Embodiments of the invention have been described in terms of senders and recipients, each of which are users of the social networking system. In various embodiments, these users need not represent humans. For example, social networking systems may enable accounts for non-human entities, such as businesses and other organizations, where users of the social networking system may be able to connect to and communicate with these accounts. Embodiments of the invention may enable poke messaging from and to these accounts. Accordingly, the terms sender, recipient, and user are not intended to limit the embodiments to only those user accounts that represent humans, but rather may cover any types of accounts for which messaging may be appropriate.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which may be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for comprising:
   receiving a poke message request at a social networking system from a user interface of a user device associated with a sender who is an employee, wherein the poke message request is to initiate a poke message from the sender to a recipient who is an employer of the employee, and the user interface is for initiating the poke message and is configured to:
      disallow manual addition of message content to the poke message,
      receive a selection of the recipient for the poke message, wherein the sender and recipient are users of a social networking system and have previously established a connection within the social networking system,
      receive a request to initiate the poke message from the sender to the selected recipient, and
      responsive to receiving the request to initiate the poke message, automatically determine location information for the sender and automatically send the poke message request that includes the location information to the social networking system; and;
   responsive to receiving the poke message request, obtaining a physical location of a device associated with the sender from the received location information in the poke message request;
   generating the poke message, the poke message comprising an indication that the sender initiated a poke message, the identification of the sender, and the obtained location of the device associated with the sender;
   transmitting the poke message to a user device associated with the recipient;
   storing information about the poke message by the social networking system, the stored information comprising an identity of the sender, an identity of the recipient, and the obtained location; and
   responsive to receiving an API request from a third party application,
      identifying a listing of records of previous poke messages between the sender and the recipient, each record comprising a time stamp and a location associated with the poke message, and
      providing the third party application with a portion of the listing of records,
   wherein the third party application is configured to generate a timecard report comprising information generated based on the sender's poke messages and one or more other users associated with the employer.

2. The method of claim 1, wherein the poke message further comprises a time stamp associated with the poke message.

3. The method of claim 2, wherein the stored information about the poke message further comprises the time stamp.

4. The method of claim 2, wherein the time stamp associated with the poke message is representative of the time that the poke message was received by the recipient.

5. The method of claim 2, wherein the time stamp associated with the poke message is representative of the time that the poke message was requested from the sender.

6. The method of claim 1, wherein obtaining a location of the sender comprises determining a location of the user device associated with the sender.

7. The method of claim 6, wherein the location is obtained from a GPS module of the user device associated with the sender.

8. The method of claim 6, wherein the location is obtained from a check-in operation performed by the sender using the user device associated with the sender.

9. The method of claim 1, further comprising:
   verifying that the sender and the recipient are users of the social networking system and have established a connection in the social networking system.

10. The method of claim 1, further comprising:
    sending to the user device associated with the sender a listing of other users with whom the sender has established a connection within the social networking system, the listing for presentation in the user interface;
    wherein the recipient identified in the request to initiate the poke message is selected from the listing.

11. The method of claim 10, wherein the users in the listing are sorted based at least in part on an affinity between the sender and each user in the listing.

12. The method of claim 10, wherein the users in the listing are sorted based at least in part on a proximity of each user in the listing to the sender.

13. The method of claim 10, wherein the users in the listing are filtered based at least in part on an affinity between the sender and each user in the listing.

14. The method of claim 10, wherein the users in the listing are filtered based at least in part on a proximity of each user in the listing to the sender.

15. The method of claim 10, wherein the user interface receives the request to initiate the poke message via a gesture on a touch screen of the user device associated with the sender.

16. The method of claim 15, wherein the gesture comprises a physical poke on a graphical representation of the recipient.

17. The method of claim 1, further comprising:
    receiving a request from a user of the social networking system to view a poke message history;
    providing the requesting user with the requested poke history, the poke history comprising a listing of records of previous poke messages sent to or received by the requesting user, each record comprising a time stamp and a location associated with the poke message.

18. The method of claim 17, wherein the request to view the poke history specified another user of the social networking system, and the provided poke history contains only poke messages between the requesting user and the specified user.

19. The method of claim 1, further comprising:
  receiving from a third party application via an API a request to initiate a poke message.

* * * * *

UNITED STATES PATENT AND TRADEMARK OFFICE
CERTIFICATE OF CORRECTION

| | | |
|---|---|---|
| PATENT NO. | : 8,843,573 B2 | Page 1 of 1 |
| APPLICATION NO. | : 13/112948 | |
| DATED | : September 23, 2014 | |
| INVENTOR(S) | : Cuervo | |

It is certified that error appears in the above-identified patent and that said Letters Patent is hereby corrected as shown below:

Title Page, Item (75) Inventors, delete "Soleio Cuervo" and insert --Oswald Soleio Cuervo--.

Signed and Sealed this
Fifteenth Day of March, 2016

Michelle K. Lee
*Director of the United States Patent and Trademark Office*